United States Patent
Salgueiro et al.

(10) Patent No.: US 11,038,814 B2
(45) Date of Patent: Jun. 15, 2021

(54) ESTABLISHING QUALITY OF SERVICE FOR INTERNET OF THINGS DEVICES

(71) Applicant: Cisco Technology, Inc., San Jose, CA (US)

(72) Inventors: Gonzalo A. Salgueiro, Raleigh, NC (US); Santosh Ramrao Patil, Santa Clara, CA (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 16/172,766

(22) Filed: Oct. 27, 2018

(65) Prior Publication Data
US 2020/0136991 A1    Apr. 30, 2020

(51) Int. Cl.
| | |
|---|---|
| H04L 12/927 | (2013.01) |
| H04W 28/02 | (2009.01) |
| H04L 29/12 | (2006.01) |
| H04L 12/24 | (2006.01) |
| H04W 4/70 | (2018.01) |

(52) U.S. Cl.
CPC ........ H04L 47/805 (2013.01); H04L 41/0866 (2013.01); H04L 41/0893 (2013.01); H04L 61/306 (2013.01); H04W 4/70 (2018.02); H04W 28/0268 (2013.01)

(58) Field of Classification Search
CPC .............. H04L 47/805; H04L 41/0893; H04L 41/0866; H04L 4/70; H04L 61/306; H04W 28/0268; H04W 4/70
See application file for complete search history.

(56) References Cited

U.S. PATENT DOCUMENTS

| | | | |
|---|---|---|---|
| 2017/0033984 A1 | 2/2017 | Lear et al. | |
| 2017/0244600 A1 | 8/2017 | Hussein et al. | |
| 2018/0316563 A1* | 11/2018 | Kumar | ............... H04L 41/5051 |
| 2019/0236493 A1* | 8/2019 | Cam-Winget | ......... G06N 20/00 |

FOREIGN PATENT DOCUMENTS

| | | |
|---|---|---|
| CN | 103442328 A | 12/2013 |
| CN | 106657364 A | 5/2017 |

OTHER PUBLICATIONS

Ietf E. Lear and etc. "Manufacturer Usage Description Specification draft-ietf-opsawg-mud-13", Oct. 24, 2017.*
Patil, "IOT Device Policy Management Framework in 5G/4G Cellular Networks," Jun. 25, 2018. Technical Disclosure Commons, 8 pages.
"Manufacturer Usage Description Specification draft-ietf-opsawg-mud-25", E. Lear, Jun. 15, 2018, 122 pages.

* cited by examiner

Primary Examiner — Jianye Wu
(74) Attorney, Agent, or Firm — Patterson + Sheridan, LLP (57) ABSTRACT

Techniques for establishing network quality of service for an internet of things device are described. A manufacturer usage description identifier relating to the internet of things device is received. The internet of things device is coupled to a communication network. Quality of service parameters relating to the internet of things device and the communication network are determined based on the manufacturer usage description identifier. The quality of service parameters are provided to a network policy controller. The network policy controller is configured to establish a quality of service for the internet of things device on the communication network based on the one or more quality of service parameters.

16 Claims, 9 Drawing Sheets

ESTABLISHING QUALITY OF SERVICE FOR INTERNET OF THINGS DEVICES

Aspects of the present disclosure relate to quality of service for internet of things devices, and more specifically, though not exclusively, to techniques for establishing quality of service for internet of things devices.

BACKGROUND

The internet of things can be described as adding networking capabilities to physical objects or "things" that serve some purpose or function outside of computing and/or networking technologies (i.e., traditionally "unconnected" or "offline" devices). In general, these "things," sometimes referred to as IoT enabled-devices or IoT devices, are embedded with electronics, software, and network interfaces, which enable the physical objects to send and/or receive data packets over a network.

IoT devices are playing a mission-critical role across many industries, including manufacturing, transportation, health care, and many others. Within these industries, it is becoming critical to establish quality of service ("QoS") for data transferred between IoT devices and IoT servers. But currently there is no good solution available for an IoT device to inform the network or negotiate with the network infrastructure about the type of data, data rate, latency, and other QoS parameters or transport services it will need. This lack of a solution can require the network infrastructure to either manually take input from a network administrator or use best effort service for IoT devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments described herein include a method of establishing network quality of service (QoS) for an internet of things (IoT) device. The method includes receiving a manufacturer usage description (MUD) identifier relating to the IoT device, where the IoT device is coupled to a communication network. The method further includes determining, based on the MUD identifier, one or more QoS parameters relating to the IoT device and the communication network. The method further includes providing the one or more QoS parameters to a network policy controller. The network policy controller is configured to establish a QoS for the IoT device on the communication network based on the one or more QoS parameters.

Embodiments described herein further include a computer program product for establishing network QoS for an IoT device. The computer program product includes a computer-readable storage medium having computer-readable program code embodied therewith, the computer-readable program code executable by one or more computer processors to perform an operation. The operation includes receiving a MUD identifier relating to the IoT device, where the IoT device is coupled to a communication network. The operation further includes determining, based on the MUD identifier, one or more QoS parameters relating to the IoT device and the communication network. The operation further includes providing the one or more QoS parameters to a network policy controller. The network policy controller is configured to establish a QoS for the IoT device on the communication network based on the one or more QoS parameters.

Embodiments described herein further include a system. The system includes a processor and a memory storing a program, which, when executed on the processor, performs an operation. The operation includes receiving a MUD identifier relating to the IoT device, where the IoT device is coupled to a communication network. The operation further includes determining, based on the MUD identifier, one or more QoS parameters relating to the IoT device and the communication network. The operation further includes providing the one or more QoS parameters to a network policy controller. The network policy controller is configured to establish a QoS for the IoT device on the communication network based on the one or more QoS parameters.

Example Embodiments

Different IoT devices in a system may require a different network QoS. For example, a critical device in an industrial or healthcare application may require a higher QoS than a smart lightbulb. Similarly, a device streaming real-time data, like a security camera, may require a higher QoS than a device providing intermittent and less time-sensitive data, like a smart home thermometer. QoS can refer to a number of different parameters relating to the network, including jitter, packet loss, latency, etc. Further, QoS can refer to additional parameters, including peak bandwidth, a number of packets per minute, etc.

One or more techniques disclosed herein facilitate establishing QoS for IoT devices that allow an IoT device to inform a network infrastructure about the type of QoS it needs for its operation. Specifically, the QoS information for the IoT device can be provided to, and utilized by, a network policy system. The network policy system can communicate the necessary QoS changes for the IoT device to applicable network infrastructure devices. One or more of the techniques disclosed herein are applicable for both wired and wireless networks, including WiFi and cellular networks.

The manufacturer usage description (MUD) architecture has been developed to provide improved security of IoT devices. MUD is described in a proposed Internet Engineering Task Force (IETF) specification. MUD can provide a way for IoT devices to provide security configuration and access policies to a network. For example, an IoT device can use MUD to provide information to a network about which devices the IoT device should be allowed to access, what transmission protocols should be allowed, what controller(s) or domain name servers (DNS) are allowed to be used, etc. In an embodiment, one or more techniques described herein enhance and improve the MUD architecture to establish QoS for IoT devices. As it relates to the MUD architecture, a manufacturer of an IoT device can be the entity that constructs the IoT device, or a manufacturer of an IoT device can be another entity that configures the IoT device for the MUD architecture, including a systems integrator, a component provider, a retailer, or another developer.

Figure 1:
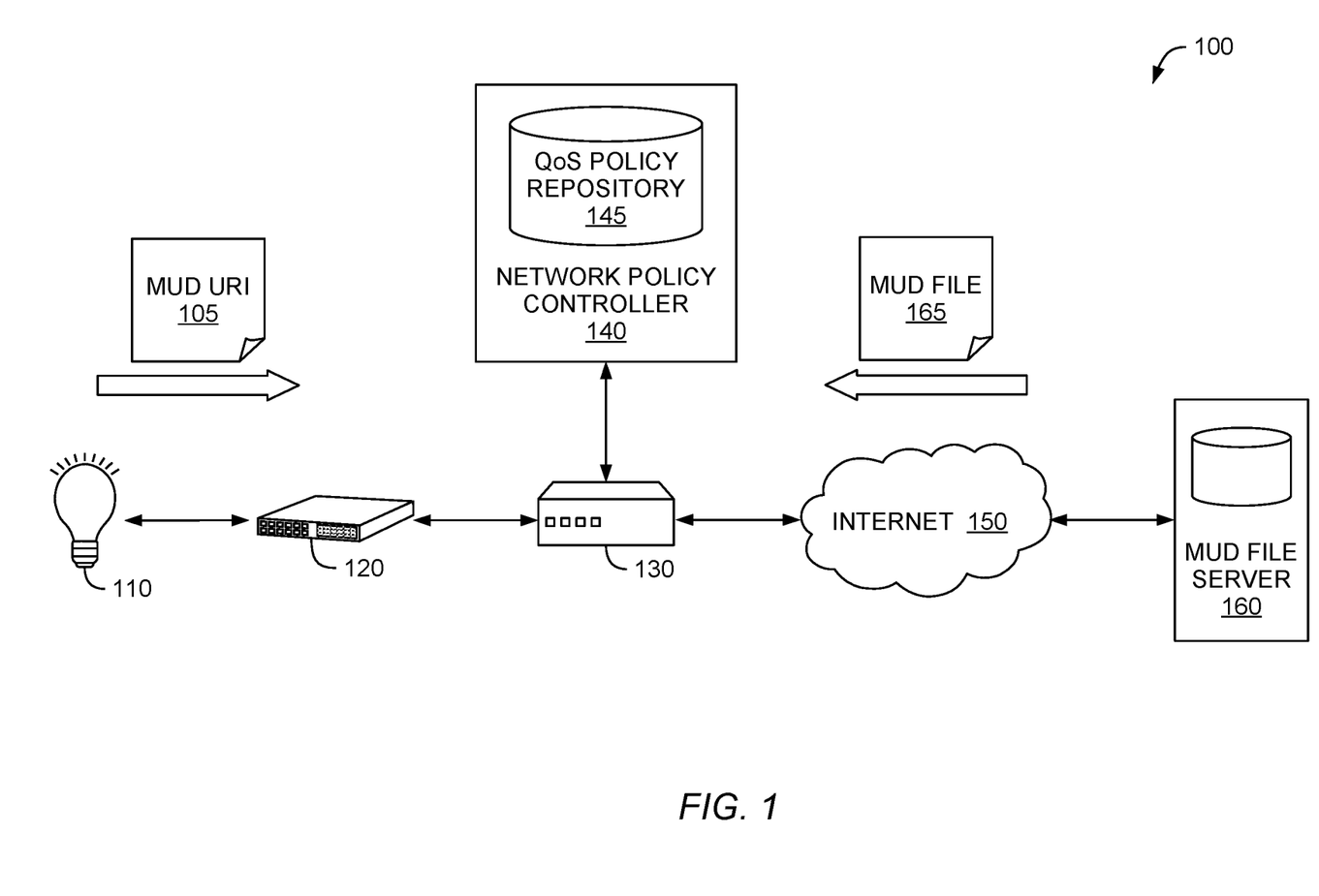
FIG. 1 illustrates a system for establishing QoS for IoT devices, according to one embodiment described herein.

FIG. 1 illustrates a system 100 for establishing QoS for IoT devices, according to one embodiment described herein. In an embodiment, the system 100 supports the MUD architecture. The system 100 includes an IoT device 110 connected to a MUD manager 130 through an access switch 120, using a communication network. In an embodiment, the IoT device 110 can be any suitable IoT device. In an embodiment, the access switch 120 can be any network access switch suitable for connecting the IoT device 110 to the MUD manager 130 using a communication network, including a hub, a switch, a bridge, etc. In an embodiment, the communication network can be any suitable communication network, including the Internet, a local access network, a mesh network, or a wide access network. The network may be wired or wireless or both. Further, while the embodiment illustrated in FIG. 1 includes the network access switch 120, in an embodiment the IoT device 110 can connect to the MUD manager 130 directly, or using any other suitable device.

The MUD manager 130 (sometimes referred to as a MUD controller) requests and receives MUD files from a MUD file server 160. Further, the MUD manager 130 can direct changes to network elements based on the MUD file. In an embodiment, the MUD manager 130 is a MUD manager as described in the MUD IETF specification. Alternatively, the MUD manager 130 can be different from a MUD manager as described in the MUD IETF specification, or can implement some, but not all, of the features described in the MUD IETF specification.

The system 100 further includes a MUD file server 160 connected to the MUD manager 130 via the Internet 150. In an embodiment, the MUD manager 130 can be connected to the MUD file server 160 through a different network, including any suitable wired or wireless network. In an embodiment, the MUD file server 160 is a server that hosts MUD files for particular IOT devices. For example, a manufacturer or developer of the IoT device 110 can maintain the MUD file server 160 and generate MUD files stored on the MUD file server 160. In an embodiment, the MUD file server 160 is a MUD file server as described in the MUD IETF specification. Alternatively, the MUD file server 160 can be different from a MUD file server as described in the MUD IETF specification, or can implement some, but not all, of the features described in the MUD IETF specification.

As illustrated in FIG. 1, the MUD manager 130 facilitates retrieval of a MUD file corresponding to the IoT device 110. For example, in an embodiment, the IoT device 110 provides a MUD URI 105 to the MUD manager 130 via the access switch 120. The MUD URI 105 designates the network location of a MUD file corresponding to the IoT device 110. In an embodiment, a manufacturer or developer of the IoT device 110 can set the MUD URI 105 to identify the location of a MUD file server maintained by the manufacturer or developer. For example, the MUD URI 105 can include an internet URL designating the location of the MUD file server 160 and the file path for the MUD file 165 corresponding to the IoT device 110. The MUD manager 130 retrieves the MUD file 165, over the internet 150, using the MUD URI 105.

The system 100 further includes a network policy controller 140. In an embodiment, the network policy controller 140 sets, and enforces, network policies, including security and QoS policies. In an embodiment, the network policy controller 140 can be any suitable policy controller, including a policy and charging rules function (PCRF) or any other suitable controller. The network policy controller 140 can use numerous tools to facilitate QoS and other policy enforcement, including classification, marking, policing, and shaping of network traffic. In an embodiment, the network policy controller 140, or another suitable network component, can classify network traffic, mark network traffic, police network traffic, and shape network traffic to facilitate enforcement of QoS and other network policies.

In one example, the MUD manager 130 can retrieve the MUD file 165 from the MUD file server 160 and can provide the MUD file 165 to the network policy controller 140 (e.g., using any suitable communication network). The network policy controller 140 uses the MUD file 165 to enforce IoT policies, including security policies. Further, as discussed in relation to FIGS. 2-8, the network policy controller 140 can enforce IoT QoS policies.

Figure 2:
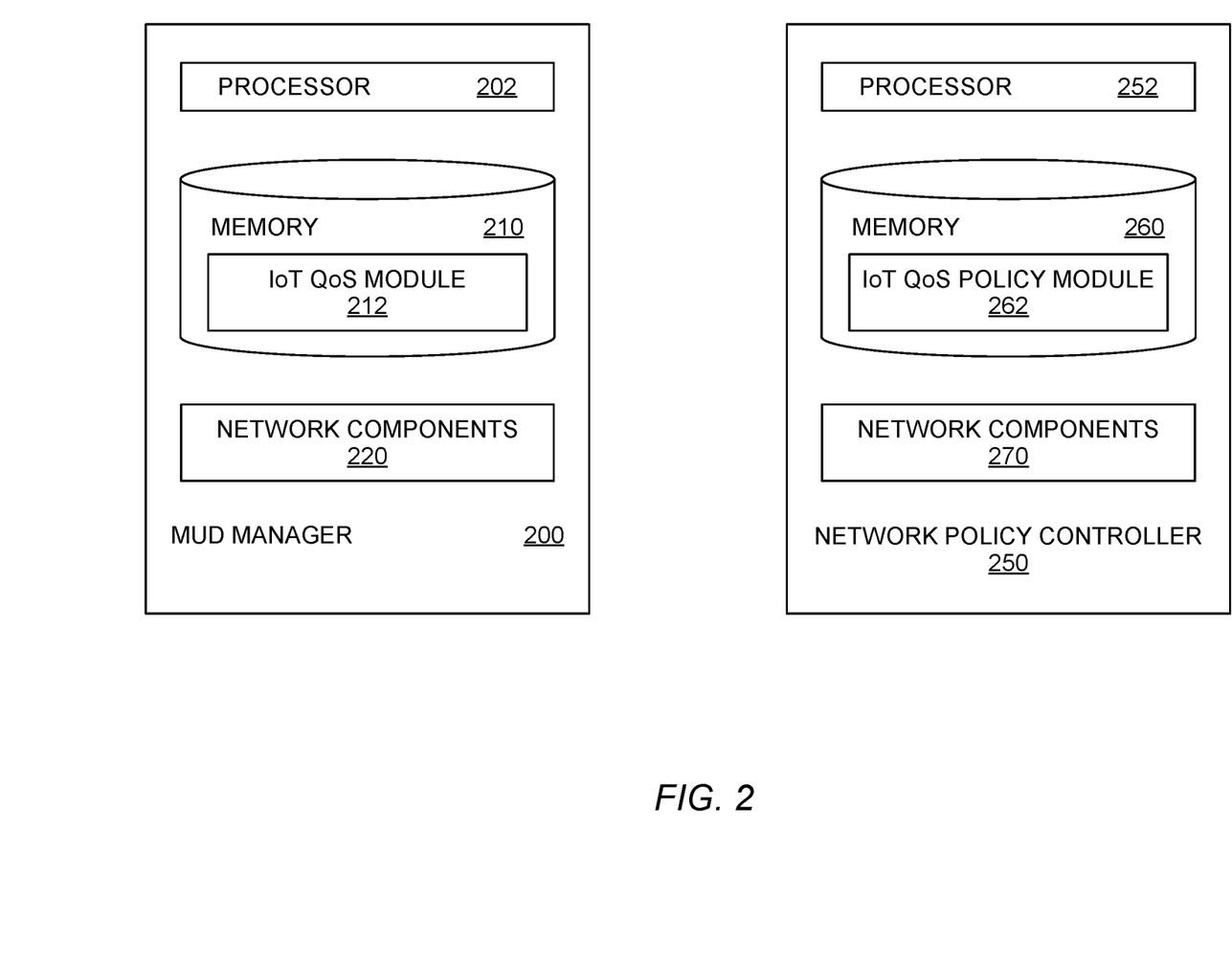
FIG. 2 illustrates a manufacturer usage description (MUD) manager and a network policy controller, according to one embodiment described herein.

FIG. 2 illustrates a MUD manager 200 and a network policy controller 250, according to one embodiment described herein. The MUD manager 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the MUD manager 200 to interface with a communication network. For example, the network components 220 can includes wireless network interface components, wired network interface components, and associated software. Although the memory 210 is shown as a single entity, the memory 210 may include one or more memory devices having blocks of memory associated with physical addresses, such as random access memory (RAM), read only memory (ROM), flash memory or other types of volatile and/or non-volatile memory. The memory 210 generally includes program code for performing various functions related to use of the MUD manager 200. The program code is generally described as various functional "applications" or "modules" within the memory 210, although alternate implementations may have different functions and/or combinations of functions. Within the memory 210, the IoT QoS module 212 establishes QoS for IoT devices, as described in relation to FIGS. 3-8.

The network policy controller 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the network policy controller 250 to interface with a communication network. For example, the network components 270 can includes wireless network interface components, wired network interface components, and associated software. Although the memory 260 is shown as a single entity, the memory 260 may include one or more memory devices having blocks of memory associated with physical addresses, such as random access memory (RAM), read only memory (ROM), flash memory or other types of volatile and/or non-volatile memory. The memory 260 generally includes program code for performing various functions related to use of the network policy controller 250. The program code is generally described as various functional "applications" or "modules" within the memory 260, although alternate implementations may have different functions and/or combinations of functions. Within the memory 260, the IoT QoS policy module 262 establishes QoS for IoT devices, as described in relation to FIGS. 3-8.

Figure 3:
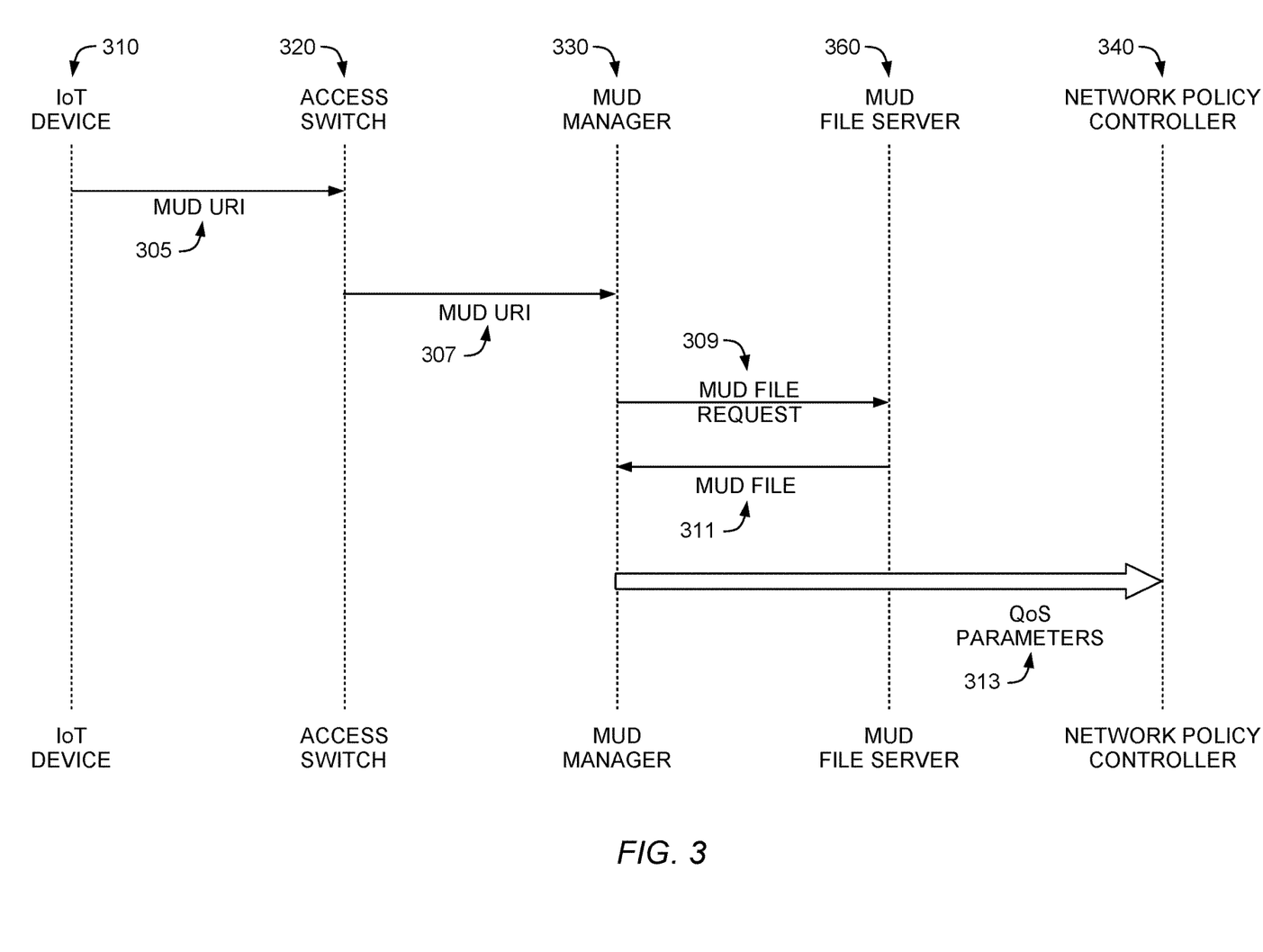
FIG. 3 illustrates establishing QoS for IoT devices using a MUD uniform resource identifier (URI), according to one embodiment described herein.

FIG. 3 illustrates establishing QoS for IoT devices using a MUD URI, according to one embodiment described herein. In this embodiment a MUD file corresponding to an IoT device (e.g., the MUD file 165 illustrated in FIG. 1) can include QoS parameters relating to that IoT device, in addition to security policy information. An IoT device 310 (e.g., the IoT device 110 illustrated in FIG. 1) transmits a MUD URI 305 (e.g., the MUD URI 105 illustrated in FIG. 1) to an access switch 320 (e.g., the access switch 120 illustrated in FIG. 1). The access switch 320 forwards the MUD URI 307 to a MUD manager 330 (e.g., the MUD manager 130 illustrated in FIG. 1). In an embodiment, the MUD URI 307 is the same as the MUD URI 305, and identifies the network location of a MUD file.

The MUD manager 330 uses the MUD URI 307 to transmit a MUD file request 309 to the MUD file server 360 (e.g., the MUD file server 160 illustrated in FIG. 1). In an embodiment, the MUD URI 307 provides an internet URL corresponding to the desired MUD file, and the MUD manager uses the internet URL to request the MUD file (e.g., using an HTTP request). In an embodiment, an IoT QoS module on the MUD manager (e.g., the IoT QoS module 212 illustrated in FIG. 2) generates and transmits this request. The MUD file server 360 responds with the MUD file 311. In an embodiment, in addition to other information included in the MUD file (e.g., security policy information), the MUD file 311 includes QoS parameters corresponding to the IoT device 310.

The MUD manager 330 transmits QoS parameters 313 to the network policy controller 340 (e.g., the network policy controller 140 illustrated in FIG. 1). In an embodiment, the MUD manager transmits the MUD file 311 to the network policy controller 340, and the network policy controller 340 parses the MUD file 311 to identify the QoS parameters. Alternatively, or in addition, the MUD manager 330 (e.g., an IoT QoS module on the MUD manager) parses the MUD file 311 and transmits the QoS parameters 313 to the network policy controller 340. The network policy controller 340 uses the QoS parameters to enforce QoS for the IoT device 310 throughout the network. In an embodiment an IoT QoS policy module on the network policy controller (e.g., the IoT QoS policy module 262 illustrated in FIG. 2) facilitates this enforcement. In an embodiment, the network policy controller 340 can enforce the QoS policy for IoT devices using classification, marking, policing, shaping, or other suitable techniques.

In an embodiment, the QoS parameters 313 include specific QoS values relating to the IoT device 310 (e.g., jitter, latency, packet loss, peak bandwidth, packets per minute, etc.). The network policy controller 340 facilitates enforcement of these QoS values for the IoT device 310 on the network. Alternatively, or in addition, the QoS parameters 313 can include information about the expected network usage of the IoT device 310 (e.g., an expected frequency of transmission, expected bandwidth usage, allowable delay, etc.). The network policy controller 340 can use this description of the expected usage of IoT device 310 to determine the QoS values for the IoT device 310, and can enforce those QoS values.

Figure 4:
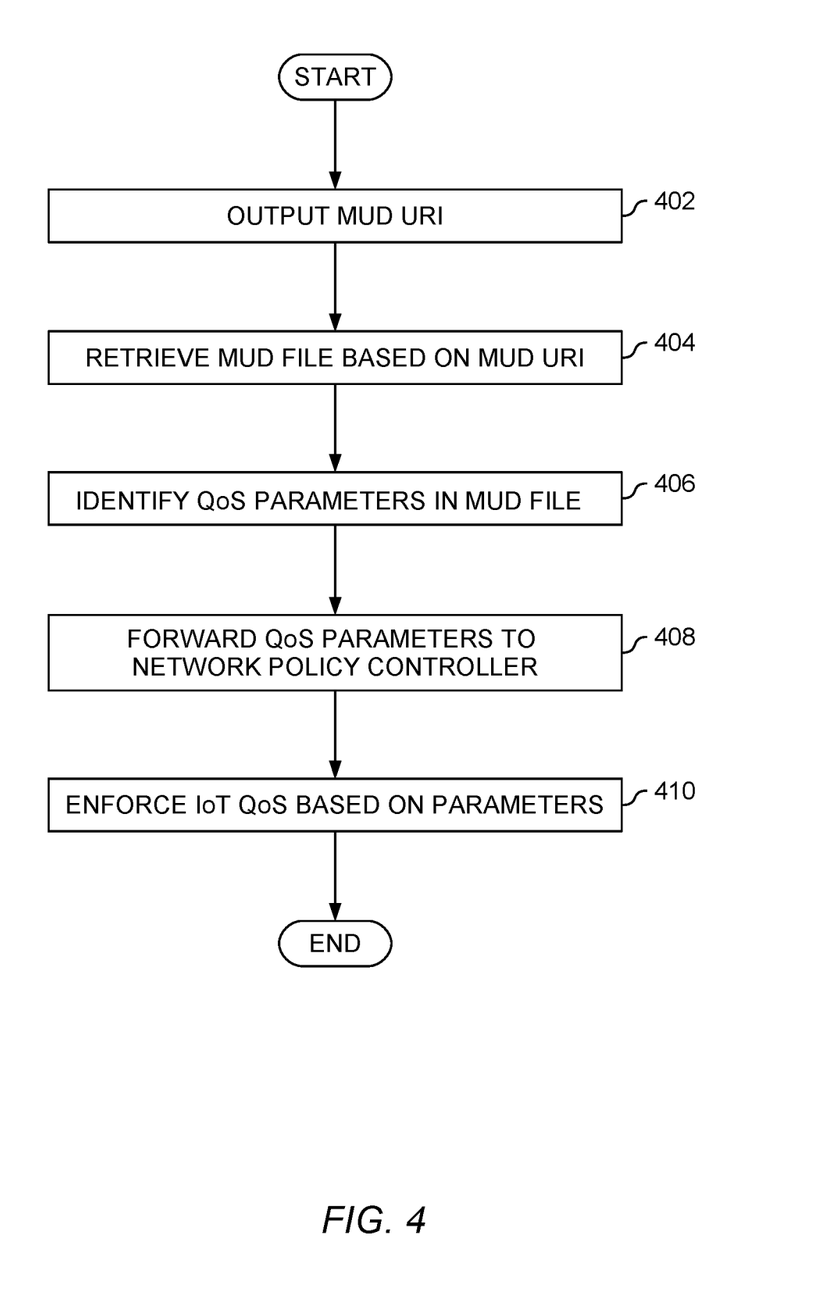
FIG. 4 is a flowchart illustrating establishing QoS for IoT devices using a MUD uniform resource identifier (URI), according to one embodiment described herein.

FIG. 4 is a flowchart illustrating establishing QoS for IoT devices using a MUD URI, according to one embodiment described herein. In an embodiment, the flowchart in FIG. 4 further illustrates FIG. 3. At block 402, an IoT device (e.g., the IoT device 110 illustrated in FIG. 1 or the IoT device 310 illustrated in FIG. 3) outputs a MUD URI. In an embodiment, this is a standard MUD URI and indicates the network location of a MUD file corresponding to the IoT device.

At block 404, an IoT QoS module (e.g., the IoT QoS module 212 illustrated in FIG. 2) uses the MUD URI to retrieve a MUD file corresponding to the IoT device. For example, the MUD URI can be an internet URL identifying a MUD file server. The IoT QoS module can send a request (e.g., an HTTP request) to the MUD file server, using the URL, and can retrieve the indicated MUD file.

At block 406, the IoT QoS module identifies QoS parameters in the retrieved MUD file. In an embodiment, the MUD file includes QoS parameters relating to the IoT device. The IoT QoS module can parse the MUD file to identify these parameters. At block 408, the IoT QoS module forwards the identified QoS parameters associated with the IoT device to a network policy controller. In an embodiment, the IoT QoS module parses the MUD file and transmits QoS parameters from the MUD file to the network policy controller. Alternatively, the IoT QoS module transmits the MUD file to the network policy controller, and the network policy controller parses the MUD file to identify the QoS parameters.

At block 410 an IoT QoS policy module (e.g., the IoT QoS policy module 262 illustrated in FIG. 2) enforces the requested IoT QoS based on the parameters in the MUD file. As discussed above, in an embodiment the QoS parameters include specific QoS values relating to the IoT device (e.g., jitter, latency, packet loss, peak bandwidth, packets per minute, etc.). The IoT QoS policy module facilitates enforcement of these QoS values for the IoT device on the network. Alternatively, or in addition, the QoS parameters can include information about the expected network usage of the IoT device (e.g., an expected frequency of transmission, expected bandwidth usage, allowable delay, etc.). The IoT QoS policy module can use this description of the expected usage of IoT device to determine the QoS values for the IoT device, and can enforce those QoS values.

Figure 5:
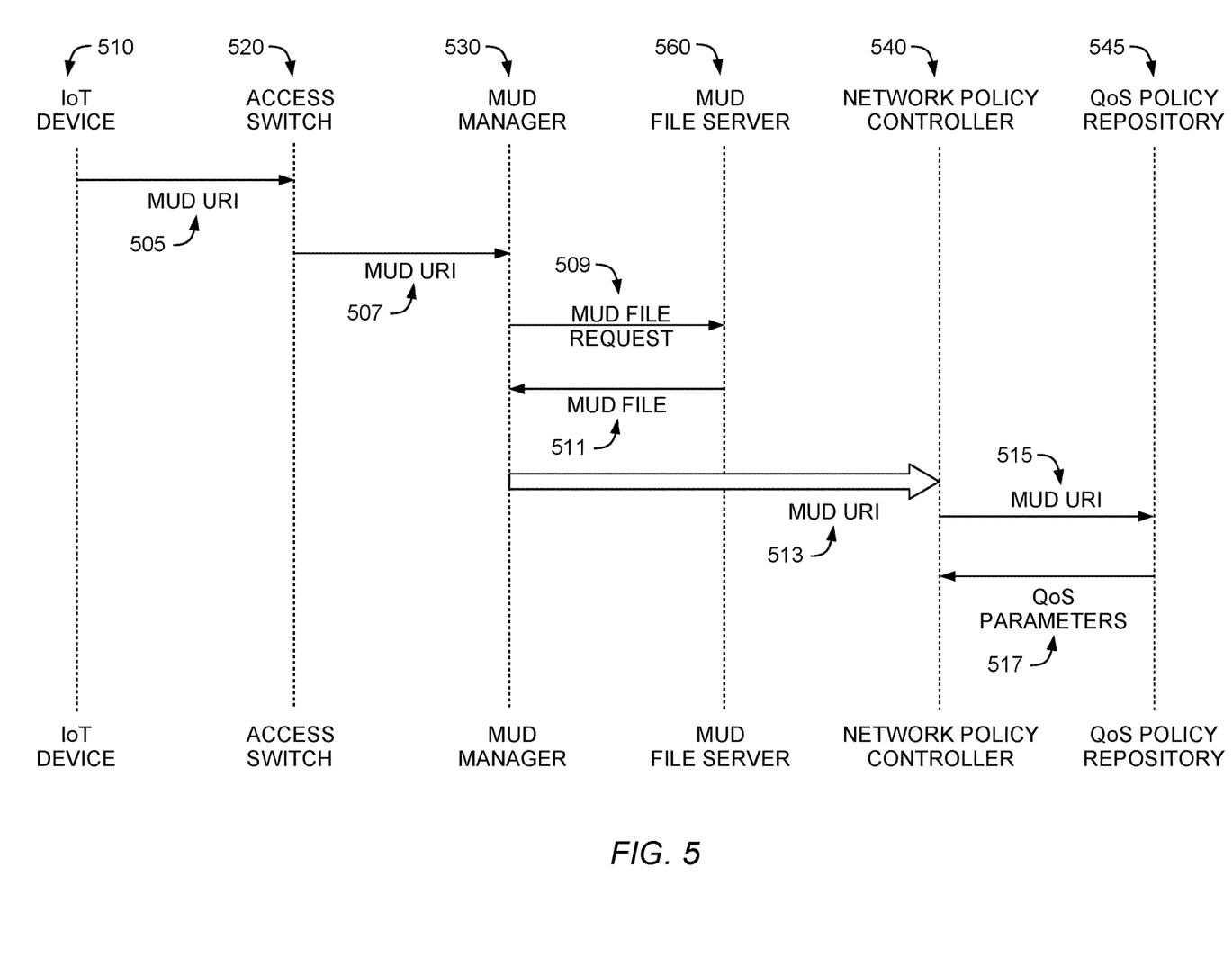
FIG. 5 illustrates establishing QoS for IoT devices using a QoS policy repository, according to one embodiment described herein.

FIG. 5 illustrates establishing QoS for IoT devices using a QoS policy repository, according to one embodiment described herein. In this embodiment the network includes a QoS policy repository that can be used to correlate a MUD URI with QoS parameters for an IoT device. An IoT device 510 (e.g., the IoT device 110 illustrated in FIG. 1) transmits a MUD URI 505 (e.g., the MUD URI 105 illustrated in FIG. 1) to an access switch 520 (e.g., the access switch 120 illustrated in FIG. 1). The access switch 520 forwards the MUD URI 507 to a MUD manager 530 (e.g., the MUD manager 130 illustrated in FIG. 1). In an embodiment, the MUD URI 507 is the same as the MUD URI 505, and identifies the network location of a MUD file.

The MUD manager 530 uses the MUD URI 507 to transmit a MUD file request 509 to the MUD file server 560 (e.g., the MUD file server 160 illustrated in FIG. 1). In an embodiment, the MUD URI 507 provides an internet URL corresponding to the desired MUD file, and the MUD manager uses the internet URL to request the MUD file (e.g., using an HTTP request). In an embodiment, an IoT QoS module on the MUD manager (e.g., the IoT QoS module 212 illustrated in FIG. 2) generates and transmits this request. The MUD file server 560 responds with the MUD file 511. In an embodiment, unlike the embodiments illustrated in FIGS. 3-4, the MUD file 511 is a standard MUD file corresponding to the IoT device 510, and does not include QoS parameters.

After receiving the MUD file 511, the MUD manager 530 enforces security (and other) policies described in the MUD file 511. In addition, the MUD manager 530 transmits the MUD URI 513 to the network policy controller 540. In an embodiment, the MUD URI 513 is the same as the MUD URI 507 and the MUD URI 505, and defines a location of the MUD file corresponding to the IoT device 510.

The network policy controller 540 uses the MUD URI 513 to retrieve QoS parameters associated with the IoT device 510. In an embodiment, the network policy controller 540 is connected with a QoS policy repository 545 (e.g., the QoS policy repository 145 illustrated in FIG. 1). The QoS policy repository 545 correlates the MUD URI 515 for a given IoT device with QoS parameters for that device. For example, the QoS policy repository 545 can be a database including MUD URIs and corresponding QoS parameters for each MUD URI. In an embodiment, the QoS policy repository 545 is located in the network policy controller 540. Alternatively, the QoS policy repository 545 is located remote from the network policy controller 540 but is accessible to the network policy controller (e.g., using a communication network). For example, the QoS policy repository 545 could be located on the same network as the network policy controller 540, the QoS policy repository 545 could be located in a secure location accessible to the network policy controller, or could be located in any other suitable location.

The QoS policy repository 545 responds to the network policy controller 540 with the QoS parameters 517 associated with the IoT device 510. As described above in relation to FIGS. 3-4, the network policy controller 540 uses these QoS parameters 517 to enforce QoS for the IoT device 510.

The QoS policy repository 545 can be populated in several different ways. In an embodiment, the QoS policy repository 545 can be populated using machine learning techniques. For example, a supervised machine learning model could be trained using IoT characteristics and resulting preferred QoS parameters. The trained machine learning model could then take as input various characteristics of an IoT device (e.g., type of device, expected frequency of transmission, expected bandwidth requirements, etc.) and can output QoS parameters corresponding to the IoT device. The QoS policy repository 545 can be populated using these QoS parameters (e.g., by including an entry for a MUD URI corresponding to the IoT device along with the determined QoS parameters). Further, the machine learning model can take into account actual usage patterns from the IoT device and modify the QoS parameters associated with the IoT device. The QoS parameters in the QoS policy repository 545 can be dynamically modified based on actual usage by the IoT device 510.

Alternatively, the QoS policy repository 545 can be populated manually. For example, a manufacturer of the IoT device 510 could provide recommended, or default, QoS parameters for the device. The QoS policy repository 545 can be populated with the MUD URI corresponding to the IoT device 510 and the QoS parameters provided by the manufacturer. Further, a user could modify the QoS parameters (e.g., if the manufacturer recommendations are not suitable, or the user experiences problems with the QoS of the IoT device 510).

Figure 6:
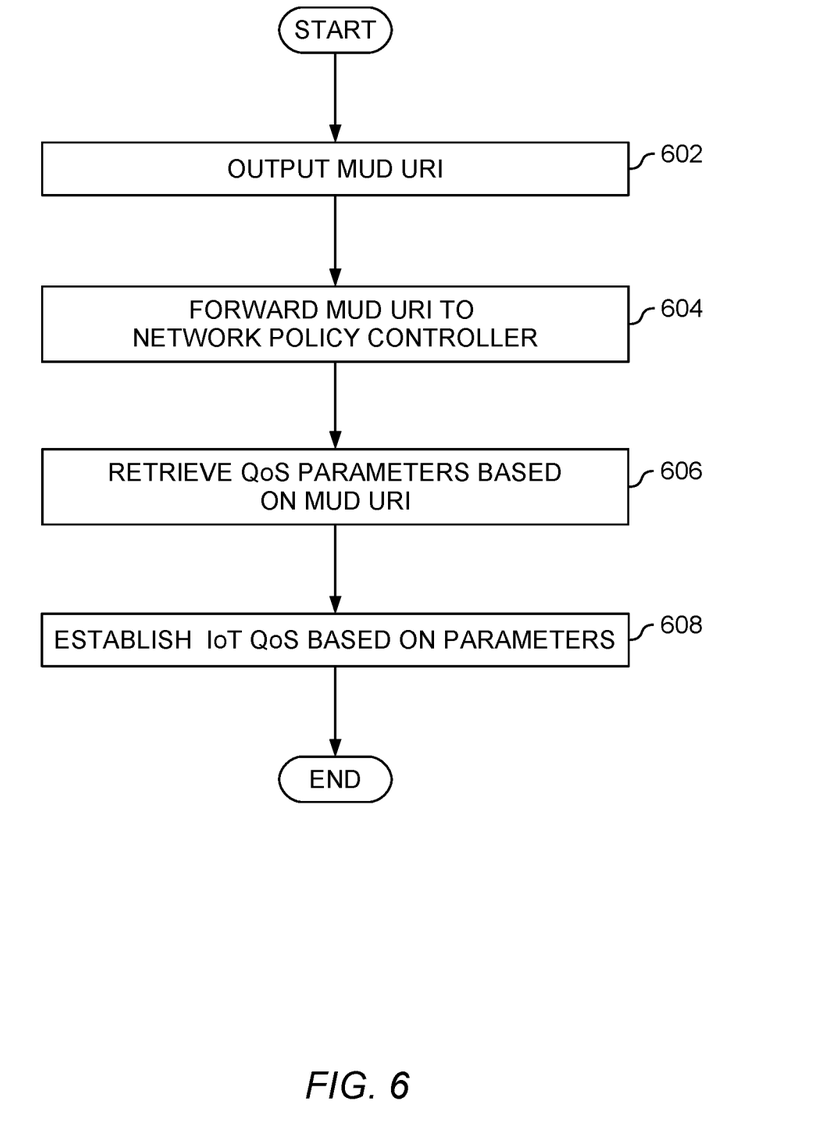
FIG. 6 is a flowchart illustrating establishing QoS for IoT devices using a QoS policy repository, according to one embodiment described herein.

FIG. 6 is a flowchart illustrating establishing QoS for IoT devices using a QoS policy repository, according to one embodiment described herein. In an embodiment, the flowchart in FIG. 6 further illustrates FIG. 5. At block 602, an IoT device (e.g., the IoT device 110 illustrated in FIG. 1 or the IoT device 510 illustrated in FIG. 5) outputs a MUD URI. In an embodiment, this is a standard MUD URI and indicates the network location of a MUD file corresponding to the IoT device.

At block 604, an IoT QoS module (e.g., the IoT QoS module 212 illustrated in FIG. 2) receives the MUD URI and forwards it to a network policy controller. The network policy controller then uses the MUD URI to retrieve QoS parameters associated with the IoT device. At block 606, an IoT QoS policy module (e.g., the IoT QoS policy module 262 illustrated in FIG. 2) retrieves the QoS parameters based on the MUD URI. In an embodiment, the IoT QoS policy module transmits the MUD URI to a QoS policy repository. The QoS policy repository maintains a correlation between a MUD URI for a given IoT device and QoS parameters corresponding to the device. The QoS policy repository responds to the IoT QoS policy module with the QoS parameters corresponding to the MUD URI and the IoT device.

At block 608 the IoT QoS policy module enforces the requested IoT QoS based on the retrieved parameters. As discussed above, in an embodiment the QoS parameters include specific QoS values relating to the IoT device (e.g., jitter, latency, packet loss, peak bandwidth, packets per minute, etc.). The IoT QoS policy module facilitates enforcement of these QoS values for the IoT device on the network. Alternatively, or in addition, the QoS parameters can include information about the expected network usage of the IoT device (e.g., an expected frequency of transmission, expected bandwidth usage, allowable delay, etc.). The IoT QoS policy module can use this description of the expected usage of IoT device to determine the QoS values for the IoT device, and can enforce those QoS values.

Figure 7:
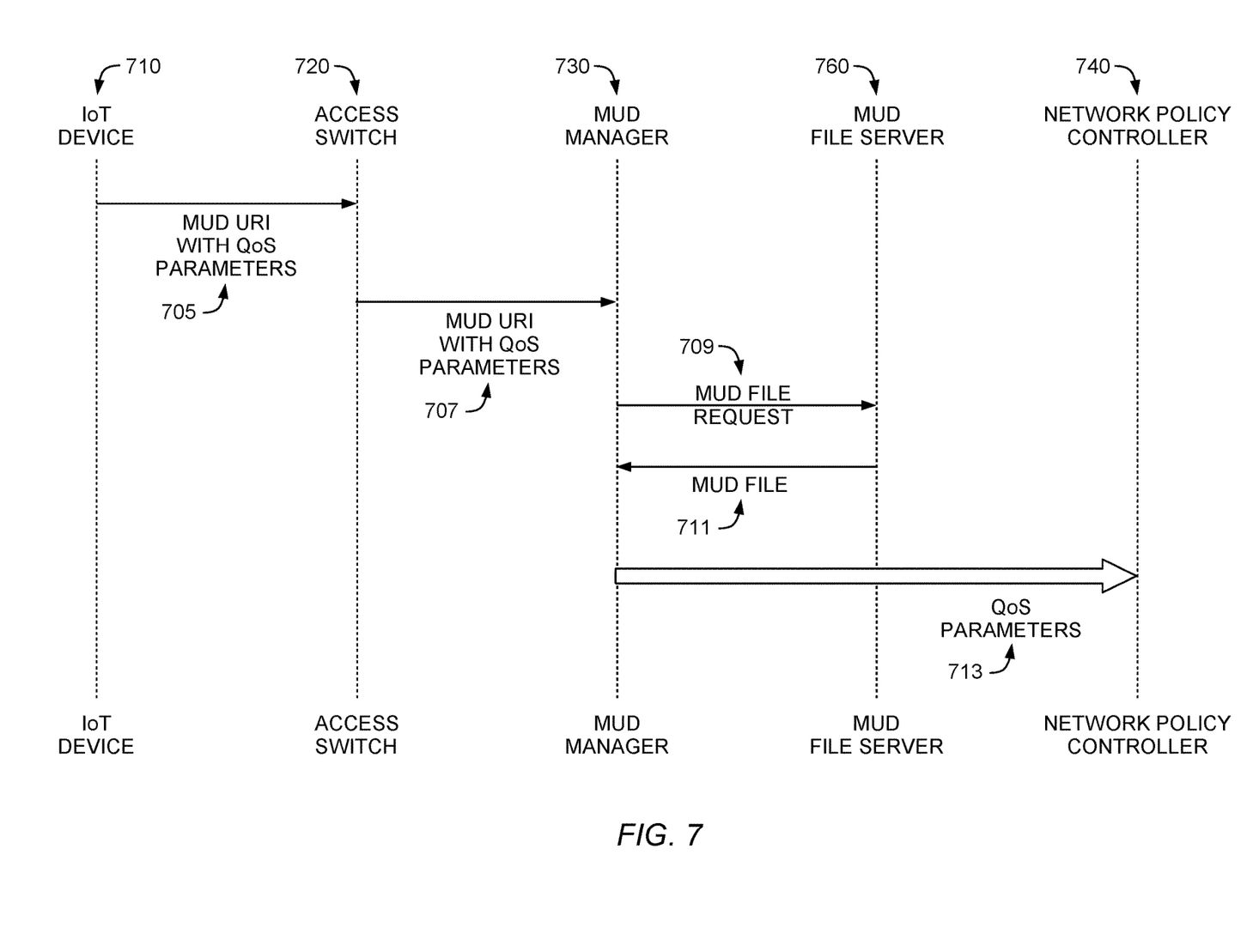
FIG. 7 illustrates establishing QoS for IoT devices using a modified MUD URI, according to one embodiment described herein.

FIG. 7 illustrates establishing QoS for IoT devices using a modified MUD URI, according to one embodiment described herein. In this embodiment the MUD URI includes QoS parameters associated with the IoT device. An IoT device 710 (e.g., the IoT device 110 illustrated in FIG.

1) transmits a MUD URI 705 to an access switch 720 (e.g., the access switch 120 illustrated in FIG. 1).

This MUD URI 705 both identifies the location of a MUD file associated with the IoT device 710 and includes QoS parameters associated with the IoT device 710. For example, the manufacturer or developer of the IoT device 710 can provide the IoT device with a MUD URI that includes the location of the MUD file corresponding to the IoT device 710, along with recommended or default QoS parameters for the IoT device 710. In an embodiment, the QoS parameters can be appended to the end of the MUD URI, and can be marked with a character or string designating the portion of the URI corresponding to the QoS parameters (as opposed to the MUD file location).

The access switch 720 forwards the MUD URI 707 to a MUD manager 730 (e.g., the MUD manager 130 illustrated in FIG. 1). In an embodiment, the MUD URI 707 is the same as the MUD URI 705, and also includes the QoS parameters for the IoT device 710, in addition to the location of the MUD file. The MUD manager 730 uses the MUD URI 707 to transmit a MUD file request 709 to the MUD file server 760 (e.g., the MUD file server 160 illustrated in FIG. 1). In an embodiment, the MUD URI 707 provides an internet URL corresponding to the desired MUD file, and the MUD manager uses the internet URL to request the MUD file (e.g., using an HTTP request). In an embodiment, an IoT QoS module on the MUD manager (e.g., the IoT QoS module 212 illustrated in FIG. 2) generates and transmits this request.

As discussed above, the MUD URI 707 includes both the location of the MUD file corresponding to the IoT device 710 and QoS parameters for the IoT device 710. In an embodiment, the IoT QoS module on the MUD manager parses the MUD URI 707 to remove the QoS parameters, and uses the parsed MUD URI to request the MUD file from the MUD file server 760. In this embodiment, the MUD file server 760 need not be aware that the MUD URI 707 includes QoS parameters—the MUD file request 709 can be a standard HTTP request using a URL associated with the MUD file 711. Alternatively, the IoT QoS module can use the full MUD URI 707 (including the QoS parameters) to retrieve the MUD file 711. The MUD file server 760 can recognize the QoS parameters in the MUD URI 707, and can ignore those parameters when retrieving the MUD file 711.

The MUD file server 760 responds to the MUD manager 730 with the MUD file 711. In an embodiment, unlike the embodiments illustrated in FIGS. 3-4, the MUD file 711 is a standard MUD file corresponding to the IoT device 710, and does not include QoS parameters. After receiving the MUD file 711, the MUD manager 730 undergoes the typical process to enforce security policies described in the MUD file 711. In addition, the MUD manager 730 parses the MUD URI 707 to identify the QoS parameters 713. The MUD manager 730 transmits the QoS parameters 713 to the network policy controller 740. As described above in relation to FIGS. 3-4, the network policy controller 740 uses these QoS parameters 713 to enforce QoS for the IoT device 710.

Figure 8:
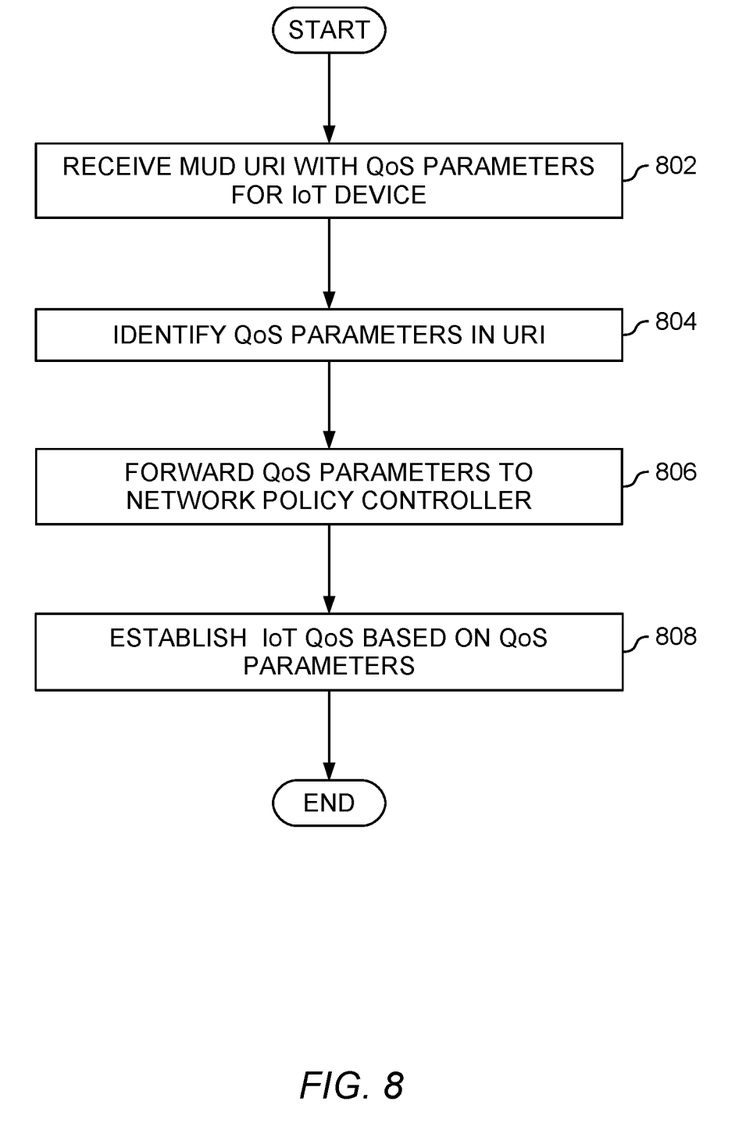
FIG. 8 is a flowchart illustrating establishing QoS for IoT devices using a modified MUD URI, according to one embodiment described herein.

FIG. 8 is a flowchart illustrating establishing QoS for IoT devices using a modified MUD URI, according to one embodiment described herein. In an embodiment, the flowchart in FIG. 8 further illustrates FIG. 7. At block 802, a MUD manager receives a MUD URI with QoS parameters for an IoT device (e.g., the MUD URI 707 illustrated in FIG. 7, with QoS parameters relating to the IoT device 710). At block 804, an IoT QoS module on the MUD manager (e.g., the IoT QoS module 212 illustrated in FIG. 2) parses the MUD URI to identify QoS parameters for the IoT device.

At block 806, the IoT QoS module forwards the identified QoS parameters associated with the IoT device to a network policy controller. At block 808 an IoT QoS policy module (e.g., the IoT QoS policy module 262 illustrated in FIG. 2) enforces the requested IoT QoS based on the parameters received from the MUD manager. As discussed above, in an embodiment the QoS parameters include specific QoS values relating to the IoT device (e.g., jitter, latency, packet loss, peak bandwidth, packets per minute, etc.). The IoT QoS policy module facilitates enforcement of these QoS values for the IoT device on the network. Alternatively, or in addition, the QoS parameters can include information about the expected network usage of the IoT device (e.g., an expected frequency of transmission, expected bandwidth usage, allowable delay, etc.). The IoT QoS policy module can use this description of the expected usage of IoT device to determine the QoS values for the IoT device, and can enforce those QoS values.

Figure 9:
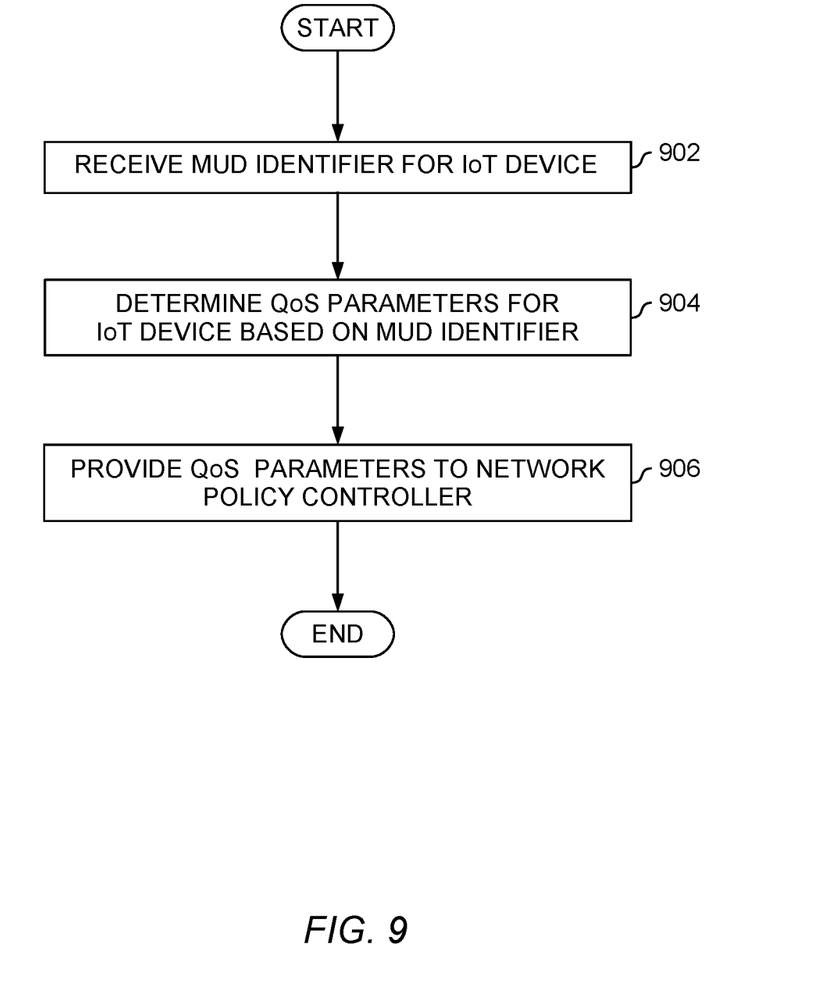
FIG. 9 is a flowchart illustrating establishing QoS for an IoT device based on a MUD identifier, according to one embodiment described herein.

FIG. 9 is a flowchart illustrating establishing QoS for an IoT device based on a MUD identifier, according to one embodiment described herein. At block 902, an IoT QoS module (e.g., the IoT QoS module 212 in the MUD manager 200 illustrated in FIG. 2) receives a MUD identifier relating to an IoT device (e.g., the IoT device 110 illustrated in FIG. 1. In an embodiment, this MUD identifier can be a URI, a URL, or any other suitable identifier.

At block 904, the IoT QoS module determines QoS parameters for the IoT device based on the MUD identifier. In an embodiment, the IoT QoS module can determine the QoS parameters using any of the techniques described above in relation to FIGS. 3-8, which will not be repeated here. At block 906, the IoT QoS module provides the QoS parameters to a network policy controller (e.g., the network policy controller 140 illustrated in FIG. 1). As discussed above, the network policy controller can establish the QoS for the IoT device based on the QoS parameters.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the IoT QoS module 212 or the IoT QoS policy module 262) or related data available in the cloud. For example, the IoT QoS module 212 or the IoT QoS policy module 262 could execute on a computing system in the cloud and facilitate enforcement of IoT QoS. In such a case, for example, the IoT QoS policy module 262 could retrieve QoS parameters associated with an IoT device from a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of establishing network quality of service (QoS) for an internet of things (IoT) device, the method comprising:
receiving a manufacturer usage description (MUD) identifier relating to the IoT device, wherein the IoT device is coupled to a communication network; and providing the MUD identifier to a network policy controller, wherein the network policy controller is configured to:
    determine, based on the MUD identifier, one or more QoS parameters relating to the IoT device and the communication network, wherein the MUD identifier corresponds with a MUD file that does not include the QoS parameters; and
    establish a QoS for the IoT device on the communication network based on the one or more QoS parameters.

2. The method of claim 1, wherein the MUD identifier comprises a uniform resource identifier (URI).

3. The method of claim 2, wherein the MUD identifier relates to a location of a MUD file corresponding to the IoT device.

4. The method of claim 1, wherein the one or more QoS parameters comprise QoS values.

5. The method of claim 1, wherein the one or more QoS parameters comprise parameters related to network usage of the IoT device.

6. The method of claim 1, wherein the network policy controller is configured to retrieve the one or more QoS parameters from a repository using the MUD identifier, and wherein the repository is not associated with a MUD file server.

7. The method of claim 1, wherein the MUD identifier comprises the one or more QoS parameters and wherein the one or more QoS parameters are determined based on parsing the MUD identifier.

8. A computer program product for establishing network QoS for an IoT device, the computer program product comprising:
    a non-transitory computer-readable storage medium having computer-readable program code embodied therewith, the computer-readable program code executable by one or more computer processors to perform an operation, the operation comprising:
        receiving a MUD identifier relating to the IoT device, wherein the IoT device is coupled to a communication network; and
        providing the MUD identifier to a network policy controller, wherein the network policy controller is configured to:
            determine, based on the MUD identifier, one or more QoS parameters relating to the IoT device and the communication network, wherein the MUD identifier corresponds with a MUD file that does not include the QoS parameters; and
            establish a QoS for the IoT device on the communication network based on the one or more QoS parameters.

9. The computer program product of claim 8, wherein the network policy controller is configured to retrieve the one or more QoS parameters from a repository using the MUD identifier, and wherein the repository is not associated with a MUD file server.

10. The computer program product of claim 8, wherein the MUD identifier comprises the one or more QoS parameters and wherein the one or more QoS parameters are determined based on parsing the MUD identifier.

11. The computer program product of claim 8, wherein the one or more QoS parameters comprise parameters related to network usage of the IoT device.

12. A system, comprising:
    a processor; and
    a memory storing a program, which, when executed on the processor, performs an operation, the operation comprising:
        receiving a MUD identifier relating to an IoT device, wherein the IoT device is coupled to a communication network; and
        providing the MUD identifier to a network policy controller, wherein the network policy controller is configured to:
            determine, based on the MUD identifier, one or more QoS parameters relating to the IoT device and the communication network, wherein the MUD identifier corresponds with a MUD file that does not include the QoS parameters; and
            establish a QoS for the IoT device on the communication network based on the one or more QoS parameters.

13. The system of claim 12, wherein the MUD identifier comprises a URI and relates to a location of a MUD file corresponding to the IoT device.

14. The system of claim 12, wherein the one or more QoS parameters comprise parameters related to network usage of the IoT device.

15. The system of claim 12, wherein the network policy controller is configured to retrieve the one or more QoS parameters from a repository using the MUD identifier, and wherein the repository is not associated with a MUD file server.

16. The system of claim 12, wherein the MUD identifier comprises the one or more QoS parameters and wherein the one or more QoS parameters are determined based on parsing the MUD identifier.

* * * * *